United States Patent
Park et al.

(10) Patent No.: US 8,199,824 B2
(45) Date of Patent: Jun. 12, 2012

(54) SPATIAL RESOLUTION CONVERSION OF IMAGE SIGNAL BASED ON MOTION COMPENSATION

(75) Inventors: Sung-Cheol Park, Seongnam-si (KR); Jae-Hong Park, Seongnam-si (KR); Hyung-Jun Lim, Suwon-si (KR); Eui-Jin Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1515 days.

(21) Appl. No.: 11/705,290

(22) Filed: Feb. 12, 2007

(65) Prior Publication Data

US 2007/0223589 A1    Sep. 27, 2007

(30) Foreign Application Priority Data

Feb. 11, 2006 (KR) .................. 2006-13335

(51) Int. Cl.
*H04N 7/12* (2006.01)
(52) U.S. Cl. ......... 375/240.16; 375/240.23; 375/240.25; 348/451; 348/458; 382/300
(58) Field of Classification Search ............. 375/240.16, 375/240.23, 240.25; 382/300; 348/451, 348/458
See application file for complete search history.

(56) References Cited

U.S. PATENT DOCUMENTS

| | | | | |
|---|---|---|---|---|
| 5,754,710 A * | 5/1998 | Sekine et al. | ........... | 382/300 |
| 5,946,044 A * | 8/1999 | Kondo et al. | ........... | 348/458 |
| 6,173,013 B1 * | 1/2001 | Suzuki et al. | ........... | 375/240.16 |
| 6,275,536 B1 * | 8/2001 | Chen et al. | ........... | 375/240.25 |
| 6,430,223 B1 | 8/2002 | Lim | ........... | 375/240.16 |
| 2002/0150160 A1* | 10/2002 | Liu et al. | ........... | 375/240.16 |
| 2003/0185304 A1* | 10/2003 | Auyeung | ........... | 375/240.16 |

OTHER PUBLICATIONS

Korean Patent Application No. 1019990040209 to Krishnamurthey et al., having Publication date of Apr. 25, 2000 (w/ English Abstract page).
Japanese Patent Application No. 2003-088618 to Sugimoto, having Publication date of Oct. 21, 2004 (w/ English Abstract page).

* cited by examiner

*Primary Examiner* — Thanhnga B Truong
(74) *Attorney, Agent, or Firm* — Monica H. Choi

(57) ABSTRACT

For spatial resolution conversion of an image signal, a magnitude of a motion vector is compared to a threshold value. Single channel interpolation is performed if the magnitude of the motion vector is greater than a threshold value, and multi-channel interpolation is performed otherwise. In addition, single channel interpolation is performed for spatial resolution conversion of any frame that does not refer to another frame.

16 Claims, 5 Drawing Sheets

SPATIAL RESOLUTION CONVERSION OF IMAGE SIGNAL BASED ON MOTION COMPENSATION

This application claims priority under 35 USC §119 to Korean Patent Application No. 2006-13335, filed on Feb. 11, 2006 in the Korean Intellectual Property Office, the disclosure of which is incorporated herein in its entirety by reference.

BACKGROUND OF THE INVENTION

1. Field of the Invention

The present invention relates generally to spatial resolution conversion of an image signal, and more particularly, to using single-channel interpolation if a magnitude of a motion vector is greater than a threshold value, and using multi-channel interpolation otherwise, for attaining high resolution and stability in spatial resolution conversion.

2. Background of the Invention

When an encoder reduces the size of an image to improve compression rate or when an image encoded to a SD (standard definition) level is displayed with a HD (high definition) level display, the image signal is converted for spatial resolution. Since spatial resolution conversion of an image signal has great impact on visual quality of an image, much research has been carried out on spatial resolution conversion.

FIG. 1A is a block diagram schematically illustrating a spatial resolution conversion method 10 using single-channel interpolation according to the prior art. Referring to FIG. 1A, the spatial resolution conversion method 10 performs spatial resolution conversion on an image signal in units of a single frame to generate a magnified resolution-converted image signal.

The single-channel interpolation may be a cubic-based or spline-based linear interpolation, an edge directed interpolation (EDI), or a combination thereof, as known to one of ordinary skill in the art. However, the spatial resolution conversion method 10 using single-channel interpolation cannot achieve spatial resolution improvement when aliasing is present in an image.

FIG. 1B is a block diagram schematically illustrating a spatial resolution conversion method 20 using multi-channel interpolation according to the prior art. Referring to FIG. 1B, the spatial resolution conversion method 20 performs spatial resolution conversion based on a plurality of frames. Multi-channel interpolation typically requires high computational complexity with sub-pixel based motion estimation and high-resolution image reconstruction.

Moreover, in case of wrong motion estimation, the stability of spatial resolution conversion becomes a serious issue. In other words, when accuracy of a motion estimation value for an image signal with large motion is low, degradation occurs in the visual quality of the image due to improper spatial resolution conversion.

SUMMARY OF THE INVENTION

Accordingly, spatial resolution conversion according to the present invention uses single channel interpolation or multi-channel interpolation depending on a magnitude of a motion vector for ensuring stability with high visual quality.

For spatial resolution conversion of an image signal according to one aspect of the present invention, a magnitude of a motion vector from the image signal is compared to a threshold value. Single channel interpolation is performed on the image signal if the magnitude of the motion vector is greater than a threshold value. Multi-channel interpolation is performed on the image signal if the magnitude of the motion vector is not greater than the threshold value.

In an example embodiment of the present invention, the single channel interpolation is performed on the image signal that is for a frame that does not include any motion vector. For example, the frame that does not include any motion vector is an intra frame encoded according to an MPEG standard.

In another embodiment of the present invention, the motion vector is determined for a current frame and at least one reference frame. For example, the current frame is a predicted frame with the motion vector being determined from one reference frame according to an MPEG standard. Alternatively, the current frame is a bidirectional frame with the motion vector being determined from at least two reference frames according to an MPEG standard.

In a further embodiment of the present invention, the motion vector, the current frame, and any reference frame are used for the multi-channel interpolation of the image signal.

In another embodiment of the present invention, a sub-pixel motion vector is determined from the motion vector. In that case, the sub-pixel motion vector, the current frame, and any reference frame are used for the multi-channel interpolation of the image signal.

In a further embodiment of the present invention, the single channel or the multi-channel interpolation is performed for each of all macroblocks of a frame defined by the image signal.

In this manner, multi-channel interpolation is performed for the image having little motion since image quality is more important for such an image. On the other hand, single channel interpolation is performed for the image having large motion to prevent instability in the spatial resolution conversion.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1A, 1B, 2, 3A, 3B, 3C, 4, and 5 refer to elements having similar structure and/or function.

DETAILED DESCRIPTION OF THE INVENTION

Figure 1A:
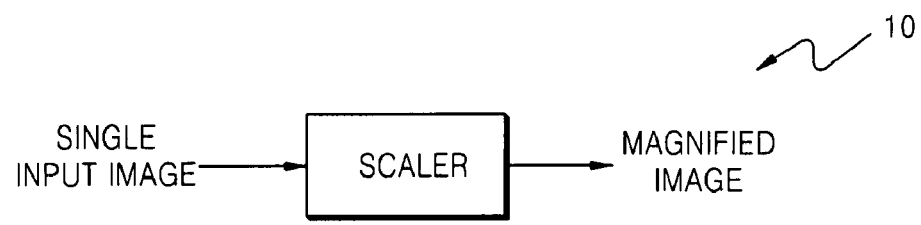
FIG. 1A is a block diagram schematically illustrating spatial resolution conversion using single-channel interpolation alone, according to the prior art.
Figure 1B:
FIG. 1B is a block diagram schematically illustrating spatial resolution conversion using multi-channel interpolation alone, according to the prior art.
Figure 2:
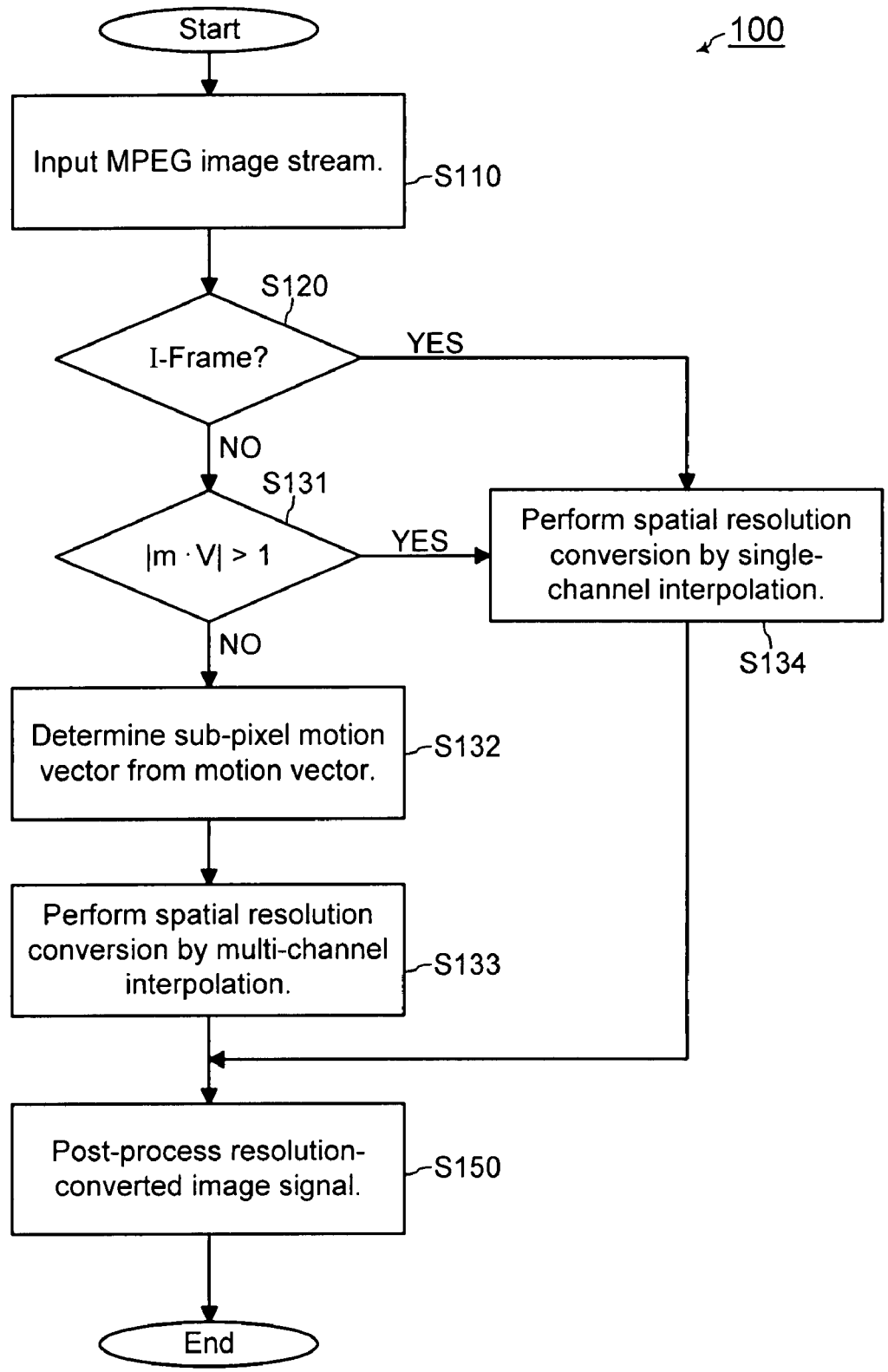
FIG. 2 is a flowchart of steps during spatial resolution conversion of an image signal using each of single-channel and multi-channel interpolations depending on a magnitude of a motion vector, according to an embodiment of the present invention.
Figure 4:
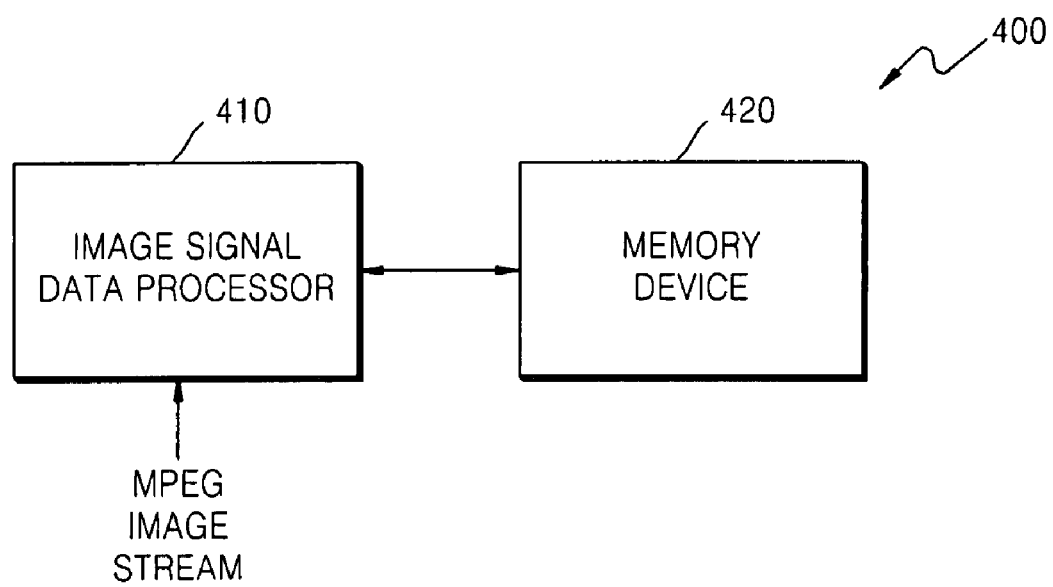
FIG. 4 shows an apparatus for performing the steps of FIGS. 2 and 5, according to an embodiment of the present invention.

FIG. 2 shows a flowchart 100 of steps for spatial resolution conversion of an image signal according to an embodiment of the present invention. FIG. 4 shows an apparatus 400 for performing such steps of the flowchart 100 of FIG. 2, according to one embodiment of the present invention.

Such an apparatus 400 may be an (ISP) image signal processor for example including an image signal data processor 410 and a memory device 420 having sequences of instructions (i.e. software) stored thereon. Execution of such sequences of instructions by the data processor 410 causes the data processor 410 to perform the steps of the flowchart 100 of FIG. 2, in one example embodiment of the present invention.

In one embodiment of the present invention, the image signal is a bit stream that is encoded according to the MPEG (moving pictures experts group) standard. Referring to FIGS. 2 and 4, the data processor 410 receives such an MPEG image stream which is an example image signal (step S110 of FIG. 2). The data processor 410 then determines whether a current frame received via the MPEG image stream refers to at least one other frame (i.e., at least one reference frame) (step S120 of FIG. 2).

In the MPEG standard, a frame that is encoded without referring to any other frame is termed an I-frame (intra frame). On the other hand, a frame that is encoded referring to one reference frame (typically an I-frame) is termed a P-frame (predicted frame). Alternatively, a frame that is encoded referring to two other reference frames (such as other I or P frames) is termed a B-frame (bidirectional frame).

If the current frame is a predicted or bidirectional frame, the MPEG image stream includes a respective motion vector m·V for each macroblock of the frame. Such motion vectors are generated for motion compensation by MPEG encoding using the current frame and the reference frame(s) for efficient video data compression according to the MPEG standard. The MPEG image stream does not include a motion vector for the intra frame according to the MPEG standard.

Referring back to FIGS. 2 and 4, if the current frame is an intra frame, the data processor 410 performs spatial resolution conversion by single channel interpolation using just the current intra frame (step S134 of FIG. 2). Such single channel interpolation is used to generate a resolution converted image signal that may be subject to further processing by the image signal processor 400 (step S150 of FIG. 2).

If the current frame is a predicted or bidirectional frame that refers to at least one reference frame, then the data processor 410 compares the magnitude of a motion vector |m·V| of the current frame to a threshold value (step S131 of FIG. 2). For example, the threshold value is "1" according to an example embodiment of the present invention. Generally, the threshold value is determined by the accuracy of the motion vector and the type of image compression system.

If the magnitude of such a motion vector |m·V| is greater than the threshold value, the data processor 410 performs spatial resolution conversion by single channel interpolation using just the current frame (step S134 of FIG. 2). Such single channel interpolation is used to generate a resolution converted image signal that may be subject to further processing by the image signal processor 400 (step S150 of FIG. 2).

On the other hand, if the magnitude of such a motion vector |m·V| is not greater than the threshold value, the data processor 410 determines a sub-pixel motion vector from the motion vector (step S132 of FIG. 2) in one embodiment of the present invention. In that case, the data processor 410 performs spatial resolution conversion by multi-channel interpolation using the current frame, the sub-pixel motion vector as determined in step S132, and any reference frame(s) referred to by the current frame (step S133 of FIG. 2).

The sub-pixel motion vector as determined in step S132 more accurately indicates the degree of change of a macroblock of the current frame. In other words, the change of such a macroblock is roughly indicated by the motion vector. The sub-pixel motion vector is calculated by the data processor 410 from the motion vector to more accurately determine the change of the macroblock. The present invention may be practiced with or without the step S132 for determining the sub-pixel motion vector.

If the step S132 for determining the sub-pixel motion vector is deleted, the complexity is reduced. In that case, the data processor 410 performs spatial resolution conversion by multi-channel interpolation using the current frame, the original motion vector m·V, and any reference frame(s) referred to by the current frame in step S133 of FIG. 2. In any case, such multi-channel interpolation in step S133 of FIG. 2 is used to generate the resolution converted image signal that may be subject to further processing by the image signal processor 400 (step S150 of FIG. 2).

In this manner, when the magnitude of the motion vector |m·V| is not greater than the threshold value, the amount of motion is small indicating that spatial resolution conversion is to be performed on a relatively stationary area. The accuracy of the motion vector is high and visual quality is more important for such a stationary area than in an area having higher motion. Thus, multi-channel interpolation which is a more accurate form of interpolation with higher amount of data processing is used for the spatial resolution conversion of such a stationary area.

On the other hand, when the magnitude of the motion vector |m·V| is greater than the threshold value, the image area has large change such that stability in resolution conversion has priority over improvement in visual quality. Thus, single-channel interpolation is used for the spatial resolution conversion of such a high-motion area.

Figure 3A:
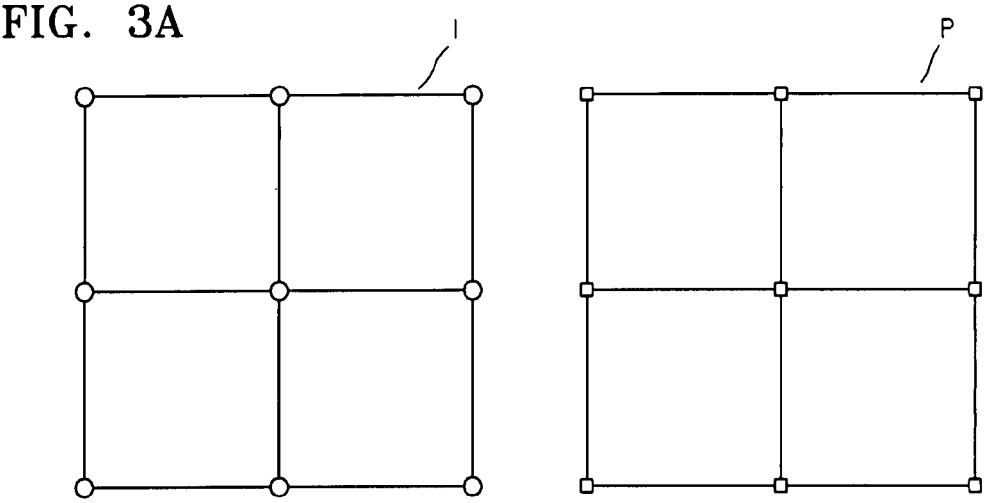
FIGS. 3A, 3B, and 3C are conceptual views illustrating multi-channel interpolation in the flow-chart of FIG. 2 or 5, according to an embodiment of the present invention.
Figure 3B:
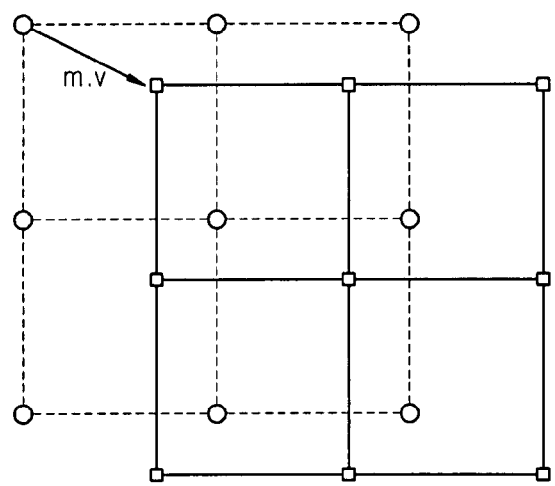
Figure 3C:
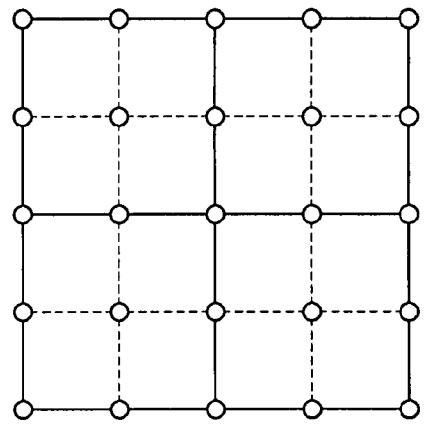

FIGS. 3A, 3B, and 3C are conceptual views illustrating multi-channel interpolation in the flowchart of FIG. 2. Referring to FIGS. 3A, 3B, and 3C, assume that a predicted frame (P) refers to an intra frame (I). The motion vector m·V for a macroblock is indicated by the MPEG image stream. The current predicted frame P, the reference intra frame 1, and the motion vector m·V are used for generating the spatial resolution converted image as illustrated in FIG. 3C.

Figure 5:
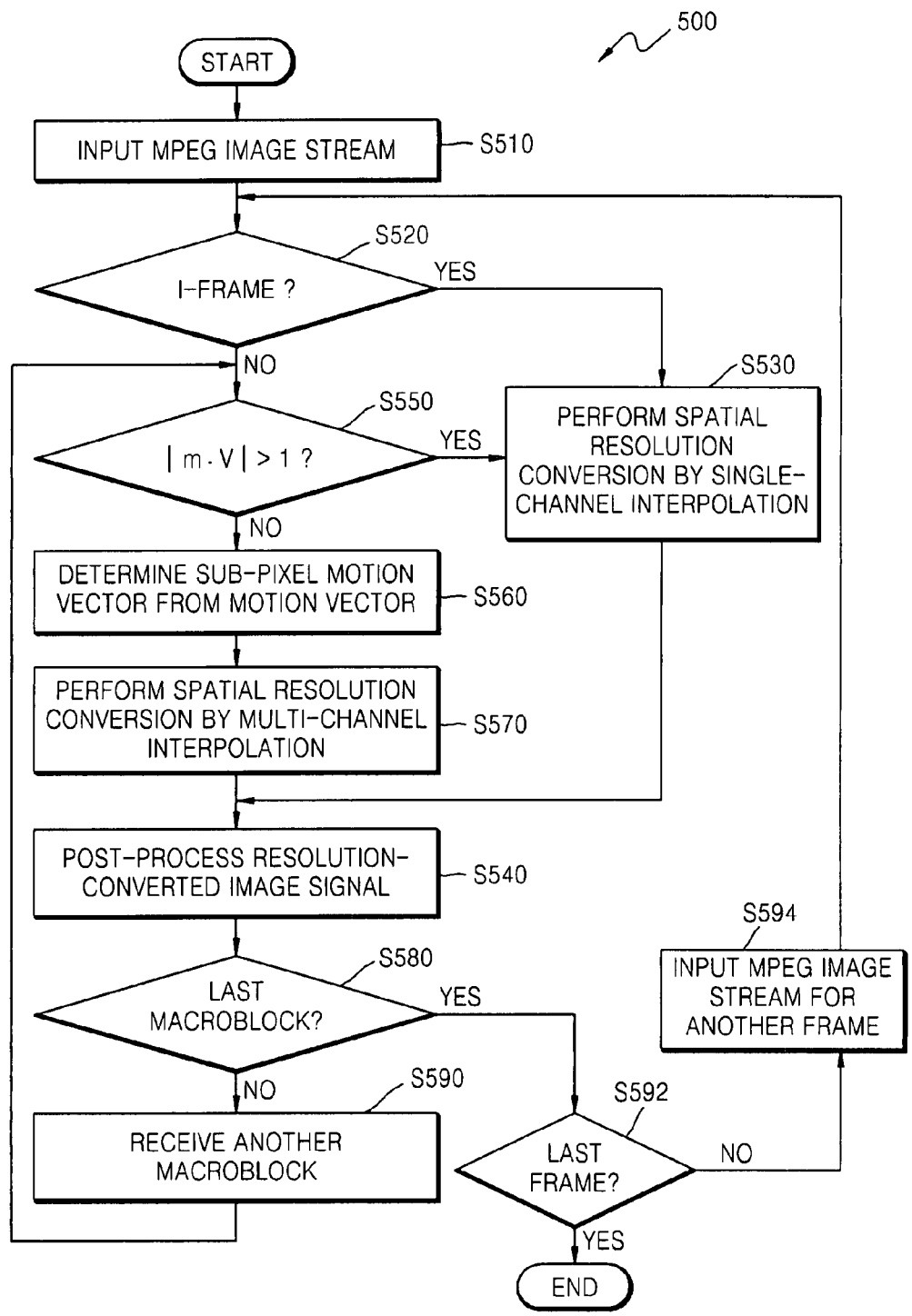
FIG. 5 shows a flowchart of steps during spatial resolution conversion of an image signal using each of single-channel and multi-channel interpolations depending on a magnitude of a motion vector, according to another embodiment of the present invention.

FIG. 5 shows a flowchart 500 of steps for spatial resolution conversion of an image signal emphasizing processing on a macroblock by macroblock basis according to another embodiment of the present invention. A macroblock includes image data for 16×16 pixels according to the MPEG standard. Referring to FIG. 4, execution of the sequences of instructions stored in the memory device 420 by the data processor 410 causes the data processor 410 to perform the steps of the flowchart 500 of FIG. 5, in such an alternative example embodiment of the present invention.

Referring to FIGS. 4 and 5, the data processor 410 receives the MPEG image stream for a macroblock of a current frame (step S510 of FIG. 5). The data processor 410 determines whether the current frame is an intra frame (step S520 of FIG. 5). If the current frame is an intra frame, the data processor 410 performs spatial resolution conversion by single channel interpolation using the current macroblock (step S530 of FIG.

5) to generate the resolution converted macroblock that may be further processed (step S540 of FIG. 5).

If the current frame is not an intra frame (step S520 of FIG. 5), the data processor 410 determines whether the magnitude of the respective motion vector |m·V| for the current macroblock is greater than the threshold value (step S550 of FIG. 5). If the magnitude of the respective motion vector |m·V| for the current macroblock is greater than the threshold value, the data processor 410 performs spatial resolution conversion by single channel interpolation using the current macroblock (step S530 of FIG. 5) to generate the resolution converted macroblock that may be further processed (step S540 of FIG. 5).

If the magnitude of the respective motion vector |m·V| for the current macroblock is not greater than the threshold value, the data processor 410 performs spatial resolution conversion by multi-channel interpolation using the current macroblock, the motion vector m·V, and any corresponding macroblock(s) of any reference frame(s) (steps S560 and S570 of FIG. 5) to generate the resolution converted macroblock that may be further processed (step S540 of FIG. 5).

The data processor 410 calculates the sub-pixel motion vector from the original motion vector m·V in step S560 similarly as described in reference to step S132 in FIG. 2. In that case, the data processor 410 uses the sub-pixel motion vector instead of the original motion vector for the multi-channel interpolation. The present invention may also be practiced without the step S560 in FIG. 5. In that case, the data processor 410 uses the original motion vector for the multi-channel interpolation.

In any case, after such spatial resolution conversion of the current macroblock, the data processor determines whether the current macroblock is a last macroblock for the current frame (step S580 of FIG. 5). If the current macroblock is not the last macroblock of the current frame, the data processor 410 receives another macroblock of the current frame via the MPEG image stream (step S590 in FIG. 5), and returns to step S550 for spatial resolution conversion of that new macroblock.

If the current macroblock is the last macroblock of the current frame, the data processor 410 determines whether the current frame is the last frame to be processed (step S592 of FIG. 5). If the current frame is the last frame to be processed, then the flowchart ends. If the current frame is not the last frame to be processed, the data processor 410 receives another macroblock of a new frame via the MPEG image stream (step S594 in FIG. 5), and returns to step S520 for spatial resolution conversion of that new frame.

For such an embodiment of FIG. 5, FIGS. 3A and 3B illustrate the current macroblock P, the reference macroblock 1, and the motion vector m·V between such macroblocks P and 1. FIG. 3C illustrates the resolution converted macroblock as determined by the data processor from the current macroblock P, the reference macroblock 1, and the motion vector m·V.

In this manner, spatial resolution conversion of each macroblock is performed with single-channel interpolation or multi-channel interpolation depending on the type of frame and the magnitude of the motion vector for each macroblock. In general, human beings are more sensitive to the resolution of a stationary image than to the resolution of a moving image. Thus, the stable and simple single-channel interpolation is used for the moving image area, and the multi-channel interpolation having higher visual quality is used for the stationary image area.

While the present invention has been particularly shown and described with reference to an exemplary embodiment thereof, it will be understood by those of ordinary skill in the art that various changes in form and details may be made therein without departing from the spirit and scope of the present invention as defined by the following claims.

The present invention is limited only as defined in the following claims and equivalents thereof.

What is claimed is:

1. A method of performing, by an image signal data processor, spatial resolution conversion of an image signal, comprising:
    A. comparing, by the image signal data processor, a magnitude of a motion vector from the image signal to a threshold value;
    B. performing, by the image signal data processor, single channel interpolation on the image signal if the magnitude of the motion vector is greater than a threshold value;
    C. performing, by the image signal data processor, multi-channel interpolation on the image signal if the magnitude of the motion vector is not greater than the threshold value;
    performing, by the image signal data processor, the single channel interpolation on the image signal and not performing said steps A, B, and C when the image signal is for a frame that does not include any motion vector;
    performing, by the image signal data processor, said steps A, B, and C when the image signal is for a frame that includes a motion vector
    wherein the motion vector is determined for a current frame and at least one reference frame;
    determining, by the image signal data processor, a sub-pixel motion vector from the motion vector; and
    using, by the image signal data processor, the sub-pixel motion vector, the current frame, and said at least one reference frame for the multi-channel interpolation of the image signal.

2. The method of claim 1, wherein the frame that does not include any motion vector is an intra frame encoded according to an MPEG standard.

3. The method of claim 1, wherein the motion vector is determined for a current frame and at least one reference frame.

4. The method of claim 3, wherein the current frame is a predicted frame with the motion vector being determined from one reference frame according to an MPEG standard.

5. The method of claim 3, wherein the current frame is a bidirectional frame with the motion vector being determined from at least two reference frames according to an MPEG standard.

6. The method of claim 3, further comprising:
    using, by the image signal data processor, the motion vector, the current frame, and said at least one reference frame for the multi-channel interpolation of the image signal.

7. The method of claim 1, further comprising:
    performing, by the image signal data processor, said steps A, B, and C for each macroblock of the image signal.

8. The method of claim 7, further comprising:
    repeating, by the image signal data processor, said steps A, B, and C for each of all macroblocks of a frame that refers to another frame.

9. An apparatus for performing spatial resolution conversion of an image signal, the apparatus comprising:
    a data processor; and a memory device having sequences of instructions stored thereon, wherein execution of said sequences of instructions by the data processor causes the data processor to perform the steps of:
A. comparing a magnitude of a motion vector from the image signal to a threshold value;
B. performing single channel interpolation on the image signal if the magnitude of the motion vector is greater than a threshold value;
C. performing multi-channel interpolation on the image signal if the magnitude of the motion vector is not greater than the threshold value;
performing the single channel interpolation on the image signal and not performing said steps A, B, and C when the image signal is for a frame that does not include any motion vector;
performing said steps A, B, and C when the image signal is for a frame that includes a motion vector,
wherein the motion vector is determined for a current frame and at least one reference frame,
determining a sub-pixel motion vector from the motion vector; and
using the sub-pixel motion vector, the current frame, and said at least one reference frame for the multi-channel interpolation of the image signal.

10. The apparatus of claim 9, wherein the frame that does not include any motion vector is an intra frame encoded according to an MPEG standard.

11. The apparatus of claim 9, wherein the motion vector is determined for a current frame and at least one reference frame.

12. The apparatus of claim 11, wherein the current frame is a predicted frame with the motion vector being determined from one reference frame according to an MPEG standard.

13. The apparatus of claim 11, wherein the current frame is a bidirectional frame with the motion vector being determined from at least two reference frames according to an MPEG standard.

14. The apparatus of claim 11, wherein execution of said sequences of instructions by the data processor causes the data processor to further perform the step of:
using the motion vector, the current frame, and said at least one reference frame for the multi-channel interpolation of the image signal.

15. The apparatus of claim 9, wherein execution of said sequences of instructions by the data processor causes the data processor to further perform the step of:
performing said steps A, B, and C for each macroblock of the image signal.

16. The apparatus of claim 15, wherein execution of said sequences of instructions by the data processor causes the data processor to further perform the step of:
repeating said steps A, B, and C for each of all macroblocks of a frame that refers to another frame.

* * * * *